(12) United States Patent
Floyd et al.

(10) Patent No.: US 9,092,151 B1
(45) Date of Patent: Jul. 28, 2015

(54) MANAGING DEDUPLICATION OF STORED DATA

(71) Applicant: Permabit Technology Corporation, Cambridge, MA (US)

(72) Inventors: Jered J. Floyd, Somerville, MA (US); Michael Fortson, Cambridge, MA (US); Assar Westerlund, Somerville, MA (US); Jonathan Coburn, Cambridge, MA (US)

(73) Assignee: Permabit Technology Corporation, Cambridge, MA (US)

( * ) Notice: Subject to any disclaimer, the term of this patent is extended or adjusted under 35 U.S.C. 154(b) by 0 days.

(21) Appl. No.: 13/800,837

(22) Filed: Mar. 13, 2013

Related U.S. Application Data

(63) Continuation-in-part of application No. 13/117,629, filed on May 27, 2011, now Pat. No. 8,463,742.

(60) Provisional application No. 61/384,212, filed on Sep. 17, 2010.

(51) Int. Cl.
  G06F 17/30 (2006.01)
  G06F 3/06 (2006.01)

(52) U.S. Cl.
  CPC .................... *G06F 3/0641* (2013.01)

(58) Field of Classification Search
  USPC .................................. 707/609, 610
  See application file for complete search history.

(56) References Cited

U.S. PATENT DOCUMENTS

| | | | | |
|---|---|---|---|---|
| 7,921,077 | B2* | 4/2011 | Ting et al. | 707/610 |
| 8,296,260 | B2* | 10/2012 | Ting et al. | 707/610 |
| 8,341,367 | B2* | 12/2012 | Akirav et al. | 711/162 |
| 8,370,297 | B2* | 2/2013 | Anglin et al. | 707/616 |
| 2009/0112945 | A1* | 4/2009 | Camble et al. | 707/204 |
| 2011/0035541 | A1* | 2/2011 | Tanaka et al. | 711/103 |
| 2011/0238635 | A1* | 9/2011 | Leppard | 707/693 |
| 2012/0158672 | A1* | 6/2012 | Oltean et al. | 707/692 |

* cited by examiner

*Primary Examiner* — Kim Nguyen
(74) *Attorney, Agent, or Firm* — Fish & Richardson P.C.

(57) ABSTRACT

In one aspect, in general, a method for managing data includes receiving, at a data deduplication engine of a computer system, data to be stored in a data storage system, computing a first value corresponding to at least one portion of the received data, determining that the first value matches a second value stored in a collection of identifiers, each identifier corresponding to a particular portion of data stored in the data storage system, each identifier comprising a computed value corresponding to the particular portion of data and including metadata indicating a location where the particular portion of data is being stored in the data storage system, and based on the determination that the first value matches a second value stored in the collection of identifiers, reallocating one or more physical locations from corresponding one or more virtual locations to different respective one or more virtual locations.

17 Claims, 10 Drawing Sheets

| 420 | | | | | | | | | | |
|---|---|---|---|---|---|---|---|---|---|---|
| VCN | 0 | 1 | ... | 94 | 95 | 96 | 97 | 98 | 99 | 100 |
| PCN | 0 | 1 | ... | 94 | 95 | 96 | 97 | 98 | 99 | 100 |
| RefCnt | 1 | 1 | ... | 1 | 1 | 1 | 1 | 1 | 1 | 1 |

FIG. 4A  400

| 420 | | | | | | | | | | |
|---|---|---|---|---|---|---|---|---|---|---|
| VCN | 0 | 1 | ... | 94 | 95 | 96 | 97 | 98 | 99 | 100 |
| PCN | 0 | 1 | ... | 94 | 95 | 96 | 97 | 98 | 99 | 100 |
| RefCnt | 1 | 1 | ... | 1 | 1 | 1 | 1 | 1 | 1 | 1 |

FIG. 4B

| 420 | | | | | | | | | | |
|---|---|---|---|---|---|---|---|---|---|---|
| VCN | 0 | 1 | ... | 94 | 95 | 96 | 94 | 95 | 99 | 100 |
| PCN | 0 | 1 | ... | 94 | 95 | 96 | 97 | 98 | 99 | 100 |
| RefCnt | 1 | 1 | ... | 2 | 2 | 1 | 0 | 0 | 1 | 1 |

FIG. 4C

MANAGING DEDUPLICATION OF STORED DATA

CLAIM OF PRIORITY

This application is a continuation-in-part and claims priority to U.S. patent application Ser. No. 13/117,629, filed on May 27, 2011, which claims priority to U.S. Patent Application Ser. No. 61/384,212, filed on Sep. 17, 2010, and the entire contents of both applications are hereby incorporated by reference.

BACKGROUND

This description relates to managing deduplication of stored data.

Some data storage systems are configured to include a deduplication function that is used to reduce the amount of storage capacity that is needed to store received data (e.g., data to be archived in the data storage system). In some implementations, deduplication works by segmenting received data into segments (also called "chunks" of data) that are identified in an index by a value, such as a cryptographic hash value. A form of data compression can be achieved by preventing duplicate segments from being stored when the data is being stored in the data storage system. For example, a given file (made up of one or more segments) that has already been stored (e.g., an email attachment attached to multiple emails in an email storage system) can simply be replaced with a reference to the previously stored file if the previously stored file has the same segments. Alternatively, a given segment within a given file that is the same as another segment in the given file or another file (e.g., a portion of document within a ZIP archive that is also stored in another ZIP archive) can be replaced with a reference to the duplicate segment.

SUMMARY

In one aspect, in general, a method for managing data includes receiving, at a data deduplication engine of a computer system, data to be stored in a data storage system, computing a first value corresponding to at least one portion of the received data, determining that the first value matches a second value stored in a collection of identifiers, each identifier corresponding to a particular portion of data stored in the data storage system, each identifier comprising a computed value corresponding to the particular portion of data and including metadata indicating a location where the particular portion of data is being stored in the data storage system, and based on the determination that the first value matches a second value stored in the collection of identifiers, reallocating one or more physical locations from corresponding one or more virtual locations to different respective one or more virtual locations.

Implementations may include one or more of the following features. Each virtual segment represents a portion of storage of a flash memory device. The portion of storage of the flash memory device is a block of the flash memory device. Reallocating one or more physical segments from corresponding one or more virtual segments to different respective one or more virtual segments includes making a request that a first portion of storage represented by a first virtual segment be merged with a second portion of storage represented by a second virtual segment. The data deduplication engine makes the request to a flash memory controller in communication with the flash memory device. The method includes allocating a first virtual location to the portion of data corresponding to the identifier corresponding to the first value, and allocating a second virtual location to the portion of data corresponding to the identifier corresponding to the second value. The method includes allocating the first virtual location and the second virtual location to a first physical location. The method includes, based on the determination that the first value matches a second value stored in the collection of identifiers, designating as unallocated a first virtual location containing a portion of data corresponding to the identifier corresponding to the first value. Designating as unallocated the first virtual location includes removing an association between the first virtual location and a first physical location. The method includes receiving an indication that an identifier corresponding to one of the respective portions of the received data was previously stored in the collection of identifiers, and, in response, verifying that the indicated identifier still corresponds to the one of the respective portions of data. The virtual locations include virtual segments.

In another aspect, in general, a method includes, at a data deduplication engine of a computer system in communication with a data storage system, computing a first value corresponding to at least one portion of data, and determining that the first value matches a second value stored in a collection of identifiers, each identifier corresponding to a particular portion of data stored in the data storage system, each identifier comprising a computed value corresponding to the particular portion of data and including metadata indicating a location where the particular portion of data is being stored in a data storage system, and based on the determination that the first value matches a second value stored in the collection of identifiers, sending a command to a controller device of the data storage system, the command comprising instructions to associate two virtual locations of the data storage system with a first physical location of the data storage system.

Implementations may include one or more of the following features. The command causes the controller device to designate a second physical location of the data storage system as unallocated. The second physical location is associated with a first virtual location corresponding to a location indicated by a first identifier associated with the first value, and designating the second physical location of the data storage system as unallocated includes removing the association between the first virtual location and the second physical location. The command identifies a first virtual location and a second virtual location, the first virtual location corresponding to a location indicated by a first identifier associated with the first value, and the second virtual location corresponding to a location indicated by a second identifier associated with the second value.

In a further aspect, in general, a system includes a data storage device, and a data deduplication engine configured to compute a first value corresponding to at least one portion of data, determine that the first value matches a second value stored in a collection of identifiers, each identifier corresponding to a particular portion of data stored in the data storage device, each identifier comprising a computed value corresponding to the particular portion of data and including metadata indicating a location where the particular portion of data is being stored in the data storage device, and based on the determination that the first value matches a second value stored in the collection of identifiers, send a command comprising instructions to associate two virtual locations of the data storage device with a first physical location of the data storage device.

Implementations may include one or more of the following features. The system includes a flash memory controller configured to receive the command. The flash memory controller is configured to, in response to the command, designate a second physical location of the data storage device as unallocated. The second physical location is associated with a first virtual location corresponding to a location indicated by a first identifier associated with the first value, and designating the second physical location of the data storage device as unallocated includes removing the association between the first virtual location and the second physical location. The command identifies a first virtual location and a second virtual location, the first virtual location corresponding to a location indicated by a first identifier associated with the first value, and the second virtual location corresponding to a location indicated by a second identifier associated with the second value.

Other aspects and advantages will be apparent from the detailed description, drawings, appendices and claims.

DESCRIPTION OF DRAWINGS

FIGS. 4A-C is an example logical unit implementation showing different abstraction levels for using deduplication advice.

DESCRIPTION

Figure 1A:
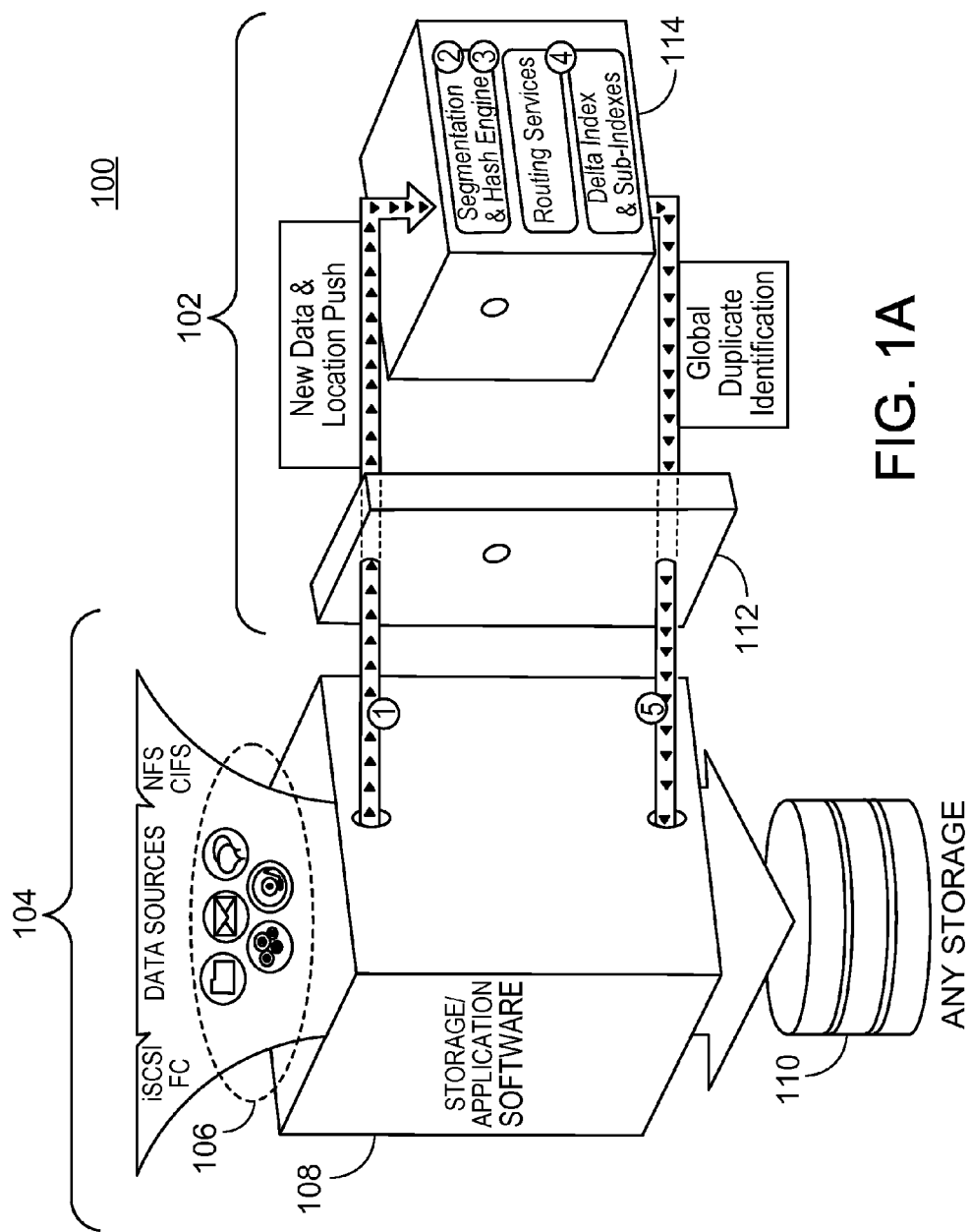
FIG. 1A is a block diagram of a system for managing stored data.

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

FIG. 1 shows an exemplary system 100 for integrating a deduplication engine 102 into a data storage system 104. The data storage system 104 is configured to receive any of a variety of types of data 106 from one or more data sources. The data 106 can include, for example, different types of files from various file systems, having different data types, and/or corresponding to different applications or operating system layers (e.g., electronic mail, media files or streams, software libraries, etc.). In this example, the system 104 includes a software layer 108 running in an execution environment hosted on one or more general-purpose computers under the control of a suitable operating system. The software layer can be configured as a database, for example, or another type of application that manages stored data. The system 104 also includes one or more storage media 110 within the execution environment accessible to the software layer 108. The execution environment can include a configuration of computer systems or computer system components (e.g., coupled via a local area network (LAN) or a storage-area network (SAN)).

The deduplication engine 102 is configured to provide an optional deduplication function for use by the data storage system 104. In this example, the deduplication engine 102 provides an application programming interface (API) 112 that includes various functions that can be called from within the software layer 108 of the data storage system 104. The software layer 108 can store new data in the media 110 optionally taking into account advice returned as output of the functions of the API 112 about whether portions of the data have already been stored in the media 110, and if so where the portions are stored. In response to the deduplication advice indicating which new segments of data have duplicates that are already stored, the software layer 108 can determine whether to represent some of the new segments by referring to the previously stored duplicates instead of storing the new segments.

When deduplication advice is desired for new data, the software layer 108 provides the new data to the deduplication engine 102 by calling a function of the API 112. The function can be called at any of a variety of stages including: while the new data is being written to the media 110, or at any subsequent time as determined by the software layer 108. Along with the new data, the software layer 108 can provide other input to the function such as application-specific metadata. For example, location information can be provided that describes where the new data is located (e.g., in a temporary storage location within the media 110 or other storage media) in the system 100 or an external location. The software layer 108 is also able to improve the accuracy of the advice from the deduplication engine 102 by calling functions of the API 112 to update the index when data is deleted or modified. In some implementations, the software layer 108 may also provide a sequence number along with the application specific metadata to the function. The software layer 108 can use the sequence number to quickly verify whether or not the deduplication advice is valid. If the location information has changed since the last time the software layer 108 queried the deduplication engine 102, then the sequence number will indicate that the deduplication advice is outdated.

In some implementations, the deduplication advice can be used by a remote user or client of a data storage system 104 to determine if a data segment needs to be transmitted over a network. For example, if the data segment is a duplicate of an existing copy of the segment, then the existing copy of the segment can be referenced instead thus saving network capacity and possibly also storage capacity.

The deduplication engine 102 includes a segmentation and index management module 114 that performs various actions to handle calls to the functions of the API 112. The module 114 segments the new data into variable-length segments, optionally taking into account characteristics of the new data to determine appropriate boundaries for the segments. For example, duplicate data may occur in files having different block alignments, such as when a file appears within two ZIP archives at different locations relative to the start of the archive. Content-aware segmentation enables the embedded file to be located and deduplicated even if the file appears at different offsets in the two archives.

The module 114 computes fingerprints as identifiers corresponding to different respective segments. In some implementations, the module 114 computes hash values that uniquely identify different respective segments, and includes the entire hash value or a shorter portion of the hash value or a shorter computed value based on the hash value in the fingerprint. In some implementations, the module 114 uses SHA-256 cryptographic hashing algorithm designed by the National Security Agency to compute the hash values for the respective segments. For example, techniques for using abbreviated values for the fingerprint are described in U.S. Pat. No. 7,457,800, and U.S. Pat. No. 7,457,813, each of which is incorporated herein by reference.

In some implementations, the fingerprint also includes a domain tag representing a domain in which one or more segments are being stored and managed. For example, the domain tag can corresponds to a section of a file system in which the one or more segments are being stored, a portion of a storage medium including, for example, any of the following: a disk or disk volume (e.g., identified by a logical unit number (LUN)), a data protected set of disks, a storage device, or a cluster of storage devices). The inclusion of the domain tag in the fingerprint enables the system 100 to distinguish between different segments that may have identical content (and therefore identical hash values) but are stored in different media and/or file systems, where it may be difficult to create references to between data stored in those different media and/or file systems.

The deduplication engine 102 stores the fingerprints in an index that includes multiple entries, each entry storing one of the fingerprints. Each entry stores a reference to the segment corresponding to the fingerprint stored in the entry.

In some implementations, different data segments may need to be indexed in a same index without being deduplicated across the segments. By way of example, a service provider may have two customer volumes on a same underlying media, but data cannot be shared between volumes. To address this situation, the index may support the creation of a domain identifier or tag (e.g., a namespace) to be associated with each segment (e.g., Client1 and Client2). The data segment associated with a first domain, e.g., Client1, will not deduplicate with the data segment associated with the second domain, e.g. Client2.

When a duplicate segment is identified, a duplicate data advisory can be sent to the software layer 108. In some implementations, the advisory can be synchronously sent via a function return. In some implementations, the advisory can be asynchronously sent via a previously registered callback function. The advisory provides metadata necessary for the software layer 108 to determine the duplicate information. For example, the metadata can include a location of the duplicate data and possibly a sequence number, each corresponding to the new segment and the previously stored segment. In some examples, the software layer 108 may notify the deduplication engine 102 that the advice is outdated (e.g., based on sequence numbers described above). In such instances, the deduplicate engine 102 updates its index to remove the outdated information. In some examples, the software layer 108 can unify data extents within the file system specific to the software layer 108 based on the advice.

When a duplicate segment is identified, a reference to the segment can also be stored in a data structure that is separate from the index. In some implementations, the data storage system 104 stores a reference to the location of a duplicate segment using a data structure that is independent of the deduplication engine 102, such as a data structure in the file system inode structure of the media 110, where the data structure is able to point directly to the location the duplicate data is stored on the media 110 (e.g., a location on a disk). This can provide the advantage of the data storage system 104 being able to operate more independently of the deduplication engine 102, without the need to rely on the index to access files that include segments that are references to duplicate segments from other files or locations within the same file. In such implementations, the deduplication engine 102 does not become critical to the reliability and availability of the data storage system 104 for data retrieval.

In alternative implementations, the data storage system 104 only stores the fingerprint value for the duplicate segment. In such implementations, the data storage system 104 would have to query the deduplication engine 102 as to where the referenced segment was located, and the deduplication engine 102 would become critical to the operation of the data storage system 104.

The index is managed such that the size of the index does not exceed a predetermined maximum size. This enables the deduplication engine 102 to limit the amount of storage space required for the index. The deduplication engine 102 provides deduplication advice for data that falls within a deduplication window corresponding to the most recently "seen" segments in order of how recently they have been seen. In some implementations, the index can include an on-disk volume for recording names corresponding to the data segments. Using this on-disk volume, the deduplicate engine 102 is able to determine the deduplication window for which the engine 102 provides deduplication advice.

Referring to FIG. 1A, an example deduplication window 150 is shown. Before the index reaches the size limit, a new segment is added to the most recently seen side 160 of the deduplication window 150 when its fingerprint is stored in the index, and gradually moves to the least recently seen side 170 of the deduplication window 150 as fingerprints for additional segments are stored in the index. After the index reaches the size limit, one or more least recently seen segments are removed from the deduplication window 150 by removing its fingerprint from the index to prevent the index from exceeding the size limit when an entry with a new fingerprint is added. Before or after the index reaches the size limit, a segment whose fingerprint is already stored in the index added to the recently seen side 160 of the deduplication window 150 when it is seen again, for example, by updating its fingerprint in the index.

Figure 1B:
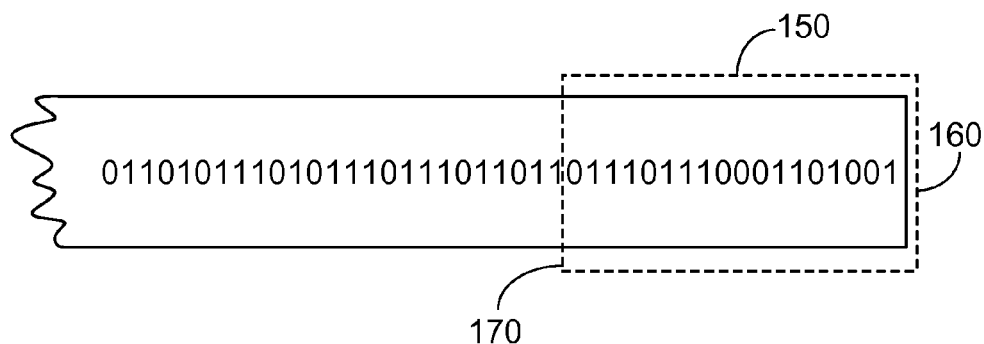
FIG. 1B is an example deduplication window.

Referring to FIG. 1B, an example index record is shown. For example, the index record 175 can include a key portion 178 and a value portion 180, each of a predetermined length (e.g., 32 bytes each for a total of 64 bytes). In some implementations, the key portion 178 can include a key representing a result of a hash function operating on the contents of a data segment. For example, the hash function can be based on the SHA-256 cryptographic hash described above. In some examples, the key can include the hash value in combination with a domain identifier (e.g., a namespace). For example, the hash value and the domain identifier can be combined based on one of the following expressions:

Key=XOR(hash,SHA256(domain identifier))

Key=SHA256(hash,domain identifier)

In some implementations, the value portion 180 can be application-provided metadata describing a data segment. For example, the value portion 180 can include an address in the storage medium corresponding to a location where the data segment is stored. In some examples, the value portion 180 can also include other metadata, such as, a sequence number and/or a transaction identifier, which may be used to validate the deduplication advice.

In some implementations, when the index reaches a predetermined size, a batch of data records representing the fingerprints (e.g., millions of records) may be marked as being discardable. These records may then be purged from the index at a time that is convenient. For example, the records can be purged as part of an operation involving data that may be in a proximity of the data marked as being discardable.

In some implementations, a segment is considered "seen" when one of three events has occurred:

a new segment has been provided to the module 114 with a fingerprint that is not currently stored in the index;

a new segment has been provided to the module 114 with a fingerprint that is currently stored in the index;

a segment that is currently stored in the index has been explicitly updated using an update function (e.g., to ensure that the segment will not be removed from the index).

The deduplication window 150 can be managed by storing index entries in order of how recently the segments corresponding to the fingerprints have been seen as new data is received. Alternatively, if deduplication is being performed for data that has already been stored in the data storage system 104, the module 114 can analyze timestamps associated with different portions of data (indicating when those portions of data were stored) to determine an order associated with the segments in the deduplication window 150 and the corresponding index entries.

The module 114 can be configured to perform other functions associated with managing the index and providing deduplication advice for the segments (e.g., as described in the exemplary embodiments of the attached appendices).

Figure 1C:
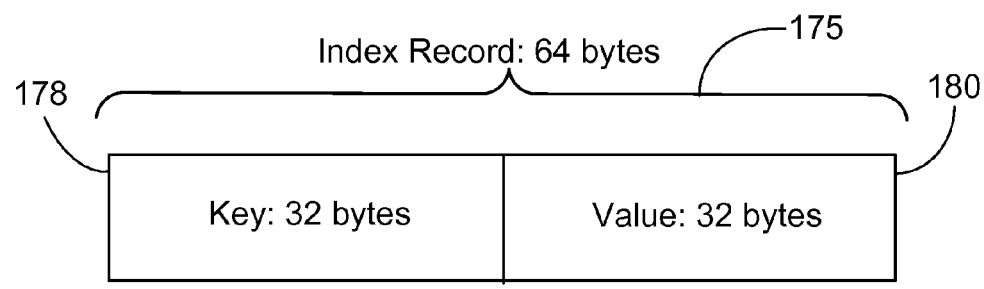
FIG. 1C is an example index record.
Figure 1D:
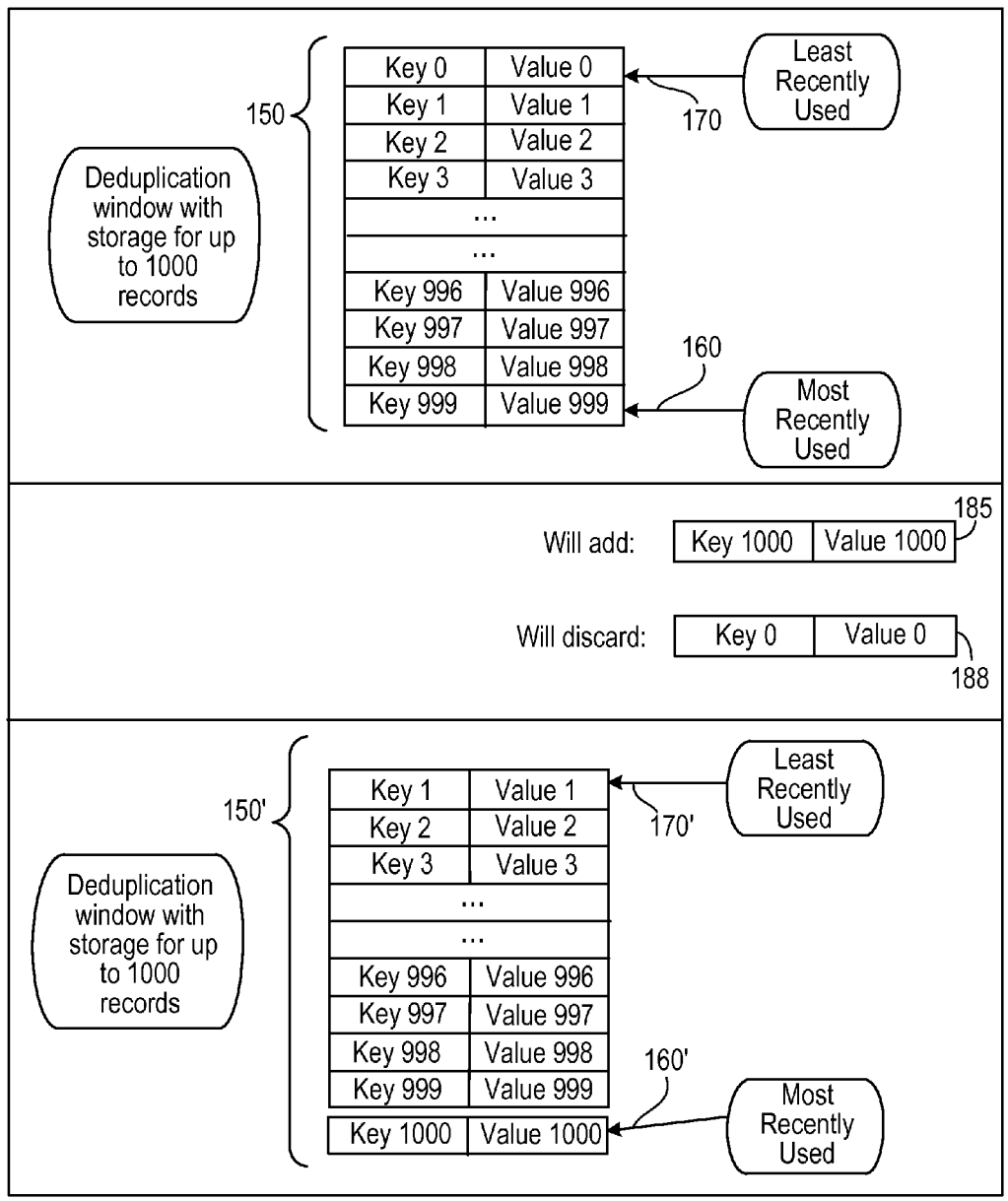
FIGS. 1D-E are example deduplication window operations.
Figure 1E:
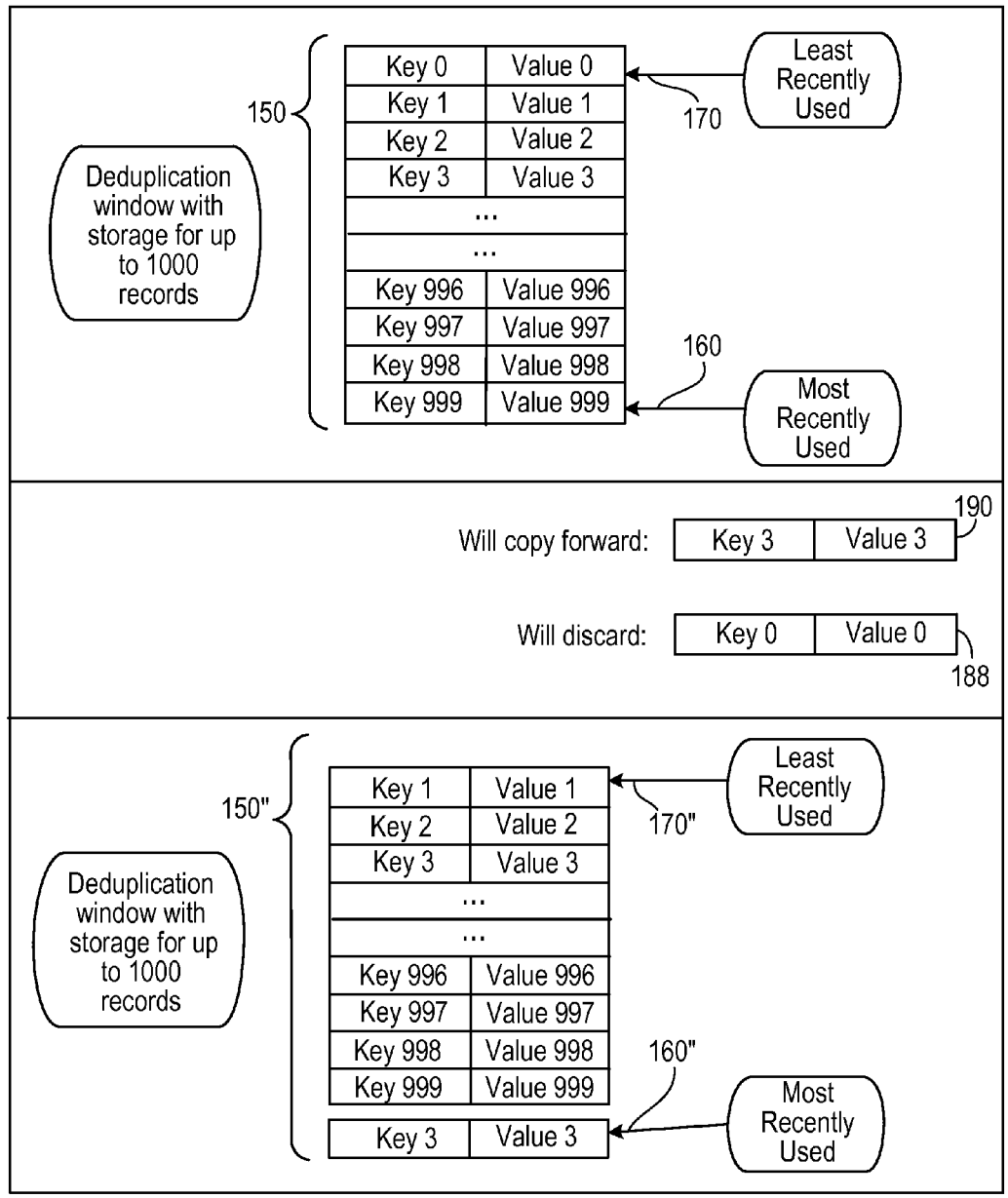

FIGS. 1C-D depict a detailed diagrammatic representation of the deduplication window 150. Referring to FIG. 1C, the window 150 has a predetermined capacity, e.g., in this case 1000 index records. As shown, the key 999 and value 999 index record is at the most recently used end 160 of the window 150. The key 0 and value 0 index record is at the least recently used end 170 of the window 150. In an implementation, the window 150 is full, i.e., there are 1000 records in the index and no room for more.

In an implementation, a process for adding a new unique record 185, i.e., a record that does not already exist in the window 150, is shown. The unique record 185 has key 1000 and value 1000 and is added to the most recently used end 160. As such, an updated most recently used end 160' is shown. To make room for the new unique record 185 an older record 188 is removed from the window 150. For example, the older record 188 is at the least recently used end 170 of the window 150. As such, an updated least recently used end 170' is shown.

Referring now to FIG. 1D, a deduplication window operation can be carried out where a previous record in the window 150 is updated. For example, the software layer 108 may look up the window 150 for a record with key 3 and value 3, e.g., record 190. Such an operation involves adding a new copy of the record 190. The new record 190 can be added to the most recently used end 160. As such, an updated most recently used end 160" is shown. To make room for the new copy of the record 190, an older record 188 is removed from the window 150 as before. For example, the older record 188 is at the least recently used end 170 of the window 150. As such, an updated least recently used end 170" is shown.

The deduplication engine 102 can be integrated as an inline, parallel, or post-process solution depending on the structure and requirements of the software later 108.

In some implementations, the deduplication engine 102 can be configured to operate outside of the data read path. In some implementations, the deduplication engine 102 can also be configured to not write or alter data written to the storage medium 110. As discussed above, the deduplication engine 102 provides deduplication advice to the software layer 108, which in turn decides how to process the data based on the advice. In this manner, the data on the storage medium 110 is protected against data corruption.

As an inline solution, the deduplication engine 102 can process incoming data segments in real-time. For example, some applications in the software layer 108 can benefit from immediate data optimization and for which a latency can be masked by parallelism and write caching. In this implementation, the deduplication engine 102 may be configured to intercept the write path to determine if data is duplicate, and then pass advice to the software layer 108.

As a parallel solution, the deduplication engine 102 can be configured to receive a copy of the data as it is written to storage medium 110. In this manner, write latency can be avoided. If a duplicate segment is identified, the software layer 108 can respond to deduplication advice by asynchronously pushing an update to the storage medium 110.

As a post-processing solution, the deduplication engine 102 can be configured to receive data back from storage medium 110, either on demand or on a fixed schedule. The deduplication device 102 can provide deduplication advice to the software layer 108, which then can push updates to the storage medium 110.

The deduplication engine 102 can be deployed as an embedded process within the software layer 102, including a set of libraries, which is enabled to provide support to any application within the software layer 102. In some implementations, the deduplication engine 102 can be deployed in a "grid" configuration, which would allow distributed clients anywhere on a network to share a same deduplication index. In such implementations, for example, the deduplication engine 102 can use a plurality of servers so the deduplication load is distributed rather than concentrated on a single server. In such a scheme, multiple client systems can create index sessions by connecting to the shared deduplication engine 102. In some implementations, in order to deduplicate data between clients systems, each client system can connect to a same set of servers.

Figure 2:
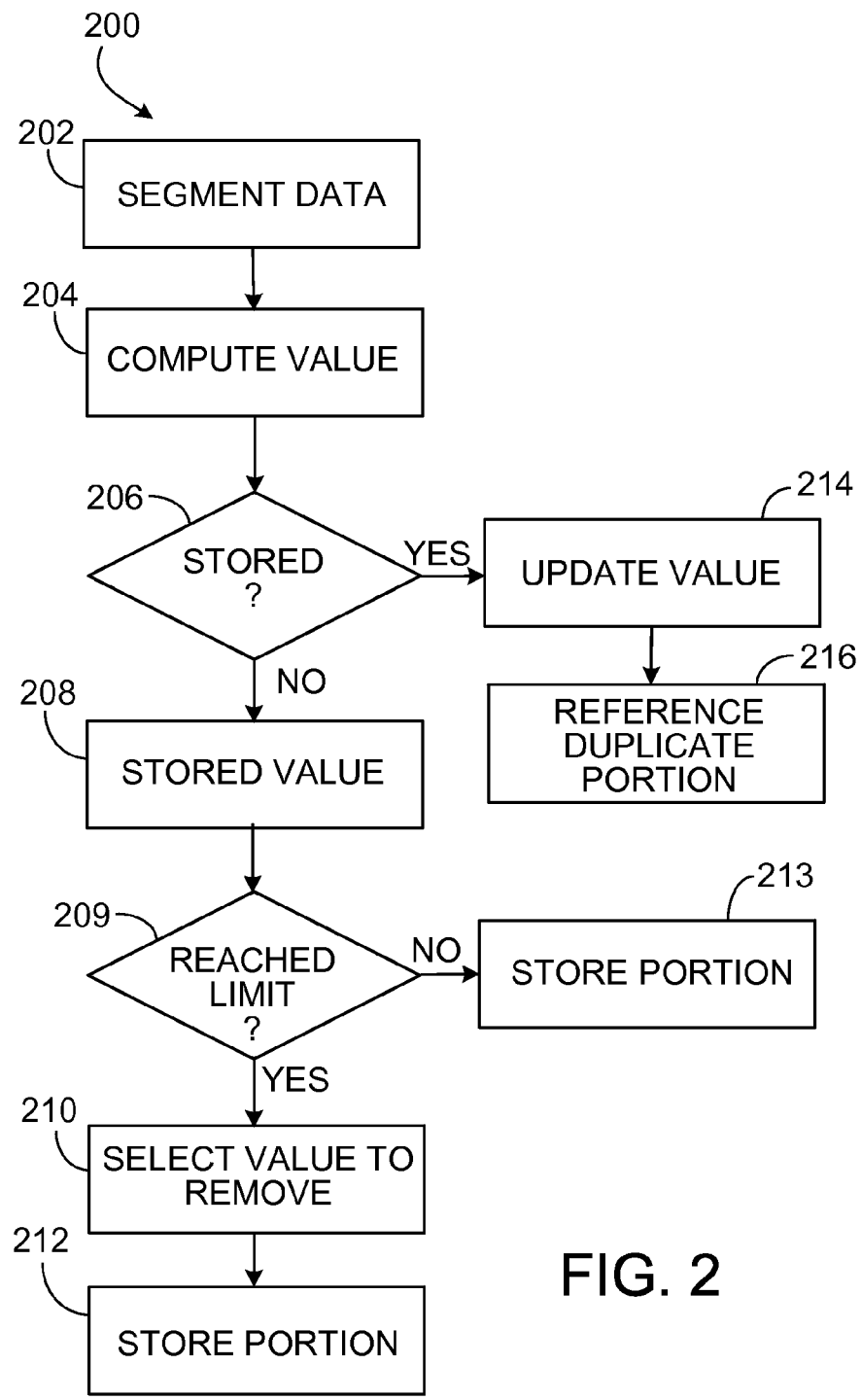
FIG. 2 is a flowchart of an exemplary data storage procedure.

FIG. 2 shows a flowchart for an exemplary deduplication procedure 200. The procedure 200 includes segmenting (202) received data into different respective portions. The procedure 200 includes computing (204) values corresponding to the different respective portions of the received data. At least some of the identifiers are stored in an index. The storing includes determining (206) whether a first identifier corresponding to a first portion of data was already stored in the index before the first portion of data was received. In response to determining that a first identifier, corresponding to a first portion of data, was not already stored in the index before the first portion of data was received, the first identifier is stored (208) in the index. If the first portion of data was received after determining (209) that the index has reached the predetermined size the procedure 200 also includes selecting (210) at least a second identifier corresponding to a second portion of data to be removed from the index such that the index does not exceed the predetermined size (e.g., based at least in part on an order in which identifiers were added to or updated in the index). The procedure 200 stores (212, 213) the first portion of data in the data storage system 104, if it was not already stored, whether or not the index has reached the limit. In response to determining that the first identifier was already stored in the index before the first portion of data was received, the first identifier is updated (214) in the index, and a data structure representing data that included the first portion of data references (216) a duplicate of the first portion of data that was already stored in the data storage system before the third portion of data was received.

In some implementations, features of the deduplication index can be developed using an application programming interface (API). For example, the API may include parameters relating to an upper limit of memory, e.g., quantified in gigabytes, to be used by the index, a number of bytes to be designated for each data segment for representing metadata (e.g., up to 32 bytes), and a maximum data segment size.

Along these lines, an example API is described below. It should be understood that there may be many ways of implementing the API, and the following is for illustration only. The API described below enables the creation of a deduplication index in an embedded deduplication engine.

A "UdsConfiguration" object can be created to specify parameters of the index being initialized:
UdsConfiguration config;
udsInitializeConfiguration(&config, memGB, sizeof (struct my_metadata), 4096);
The configuration parameters can then be used to create the index as follows:
UdsIndexSession indexSession;
udsCreateLocalIndex(path, config, &indexSession);
The path variable can be, for example, a path to a directory where a local index will write its data files.

The indexSession variable can be used to create deduplication contexts as described in detail below. The index session defined as described above is thread-safe, i.e., the API may make calls to the session in multiple threads. In some implementations, each context can be associated with a single domain corresponding to a single deduplication domain. For example, the data segments that are indexed in this manner and associated with a same domain will deduplicate against each other. Further, in examples, data segments associated with contexts corresponding to different domains will not deduplicate against each other.

In some implementations, each context can also represent a specific index type, e.g., a Block index, a Stream index, or a File index. A same index type may be used for all contexts associated with any given domain.

The API for a Block index can support deduplication at a granularity of client-defined chunks of data, but without (or with limited) content awareness. For example, the Block API may allow the software layer 108 to specify the data segments to be indexed for deduplication. As such, when the deduplication engine 102 recognizes identical data segments it may synchronously or asynchronously respond with the location of the canonical copy.

The APIs for Stream and File indices can support content-aware segmentation on file types such as Microsoft Office, PDF, ZIP, tar, and Microsoft Hyper-V images (VHD). Stream and File index may need additional processing within the software layer 108. For example, the software layer 108 may need variable-sized extent unification.

In some implementations, to create a Block type context, an example API can be configured to support the following definitions:
UdsBlockContext blockContext;
udsOpenBlockContext(session, namespace, &blockContext);
In some implementations, to create a Stream type context, an example API can be configured to support the following definitions:
UdsStreamContext streamContext;
udsOpenStreamContext(session, namespace, &streamContext);
In some implementations, to create a File type API, an example API can be configured to support the following definitions:
UdsFileContext fileContext;
udsOpenFileContext(session, namespace, &fileContext);
In some implementations, upon receiving deduplication advice from the deduplication engine 102, the software layer 108 may save space by unifying duplicate and data segments. In some situations, the software layer 108 may not perform such unifying. Such situations can include, for example, when contents of the data's canonical location has been modified or deleted. As such, that location may no longer contain an exact copy of the new data segment. In another situation, the canonical location of the data can be unchanged, but the new data segment may have been updated between the time it was posted and the time a response was asynchronously received from the deduplication engine 102. In some examples, the reference count (e.g., sequence number) of the data segment canonical location may be at its maximum and can no longer accept new incoming references.

An example mechanism by which the APIs may facilitation communication with the deduplication engine 102 is described as follows. An example block API is used below to describe the process. In some implementations, the block API can allow the software layer 108 to provide information to the deduplication engine 102 synchronously via a function called, for example udsIndexBlock, or asynchronously via a function called, for example, udsPostBlock, which uses a callback to return results. In example implementations involving the synchronous variant, udsIndexBlock may have the following signature:
int udsIndexBlock(UdsBlockContext context,
const UdsBlockAddress blockAddress,
size_t dataLength,
const void *data,
boot *hashExists,
UdsBlockAddress *canonicalBlockAddress,
UdsChunkName **blockName);
In the above snippet, the first argument context is a Block API handle corresponding to the deduplication engine 102 library. The second argument, UdsBlockAddress, is metadata defined by the software layer 108 that describes the block.

In some implementations, a size of the metadata (e.g., up to 32 bytes) can be specified when the index is created. Also, in some situations, information may be provided that uniquely describes the block. For example, such information may be a logical unit number (LUN) and/or a logical block address, a file inode and an offset into the file).

In some examples, the calling application in the software layer 108 can also provide a length of the data segment and a pointer to the data itself. When the function returns, the deduplication engine 102 can use a variable hashExists to indicate if the block has been seen before or not. The deduplication engine 102 can also provide the address of a canonical segment. If the segment is recognized as a duplicate, the canonical segment address is the previously stored metadata for the segment. Optionally, the calling application may also provide a buffer to hold the segment's UdsBlockName.

The following example demonstrates using the Block API to detect duplicate lines in a text file:
int main(int argc, char **argv)
{
char line[MAX_LINE_LEN];
int lineNo=0;
UdsConfiguration config;
udsInitializeConfiguration(&config, 1, sizeof(int), 0);
UdsIndexSession session;
udsCreateLocalIndex("/tmp/example-index", config, &session);
udsFreeConfiguration(config);

```
UdsBlockContext context;
udsOpenBlockContext(session, NULL, &context);
UdsBlockAddress prevNo;
while (fgets(line, MAX_LINE_LEN, stdin) !=NULL) {
boot hashExists;
int lineLen=strlen(line);
udsIndexBlock(context, &lineNo, lineLen, line,
&hashExists, &prevNo, NULL);
if (hashExists) {
int *lastLine=prevNo;
printf("D[% d]\n", *lastLine);
free(lastLine);
} else {
printf("N % s", line);
}
lineNo++;
}
udsCloseBlockContext(context);
udsCloseIndexSession(session);
return 0;
}
```

This snippet example above begins by configuring and creating a new local index, making a session to it, and opening a UdsBlockContext over the session to the new index (in a default domain). In some implementations, next, the snippet can read lines of the input and index them to the deduplication index (along with the line number where the line was seen). If the text has never been seen before, the snippet can print the line, otherwise the snippet prints the line number where the text was first encountered.

The asynchronous variant may be invoked by calling udsPostBlock instead of udsIndexBlock. In some implementations, the results can delivered in a separate thread via an asynchronous callback. An example function and its callback may be defined as follows:

```
int udsPostBlock(UdsBlockContext context,
UdsCookie cookie,
const UdsBlockAddress blockAddress,
size_t dataLength,
const void *data);
typedef void (*UdsDedupeBlockCallback)
(UdsBlockContext context,
UdsQueryType type,
int status,
UdsCookie cookie,
UdsBlockAddress duplicateAddress,
UdsBlockAddress canonicalAddress,
UdsChunkName *blockName,
size_t blockLength,
void *callbackArgument);
```

In some examples, the arguments to the synchronous and asynchronous interfaces may be the same. In some examples, a difference between the two types of interfaces can involve a type called UdsCookie. As with UdsBlockAddress, this type may be entirely abstract and defined by the software layer 108. Unlike UdsBlockAddress, however, UdsCookie is not stored in the index. Instead, the Application Software uses UdsCookie to provide the callback thread with context for handling deduplication advice. In some implementations, the deduplication engine 102 may not deliver the callbacks in the order in which they were posted. To ensure that all outstanding callbacks have been delivered, the software layer 108 can call function udsFlushBlockContext.

When the duplicate data segment no longer matches the previously stored data segment, the duplicate advice is deemed stale. To prevent data corruption, the software layer 108 does not apply the stale advice. An example of validating advice is to read the new data segment and compare it with the data segment stored in the storage medium 110. If the contents match, the storage locations may be unified. Alternatively, the storage system can include a sequence number with the storage location metadata and use the sequence number to detect modifications.

In some implementations, the software layer 108 can store hash information associated with the data segment with the data segment. In this case the application may only need to compare the hashes instead of comparing the actual data.

Figure 3:
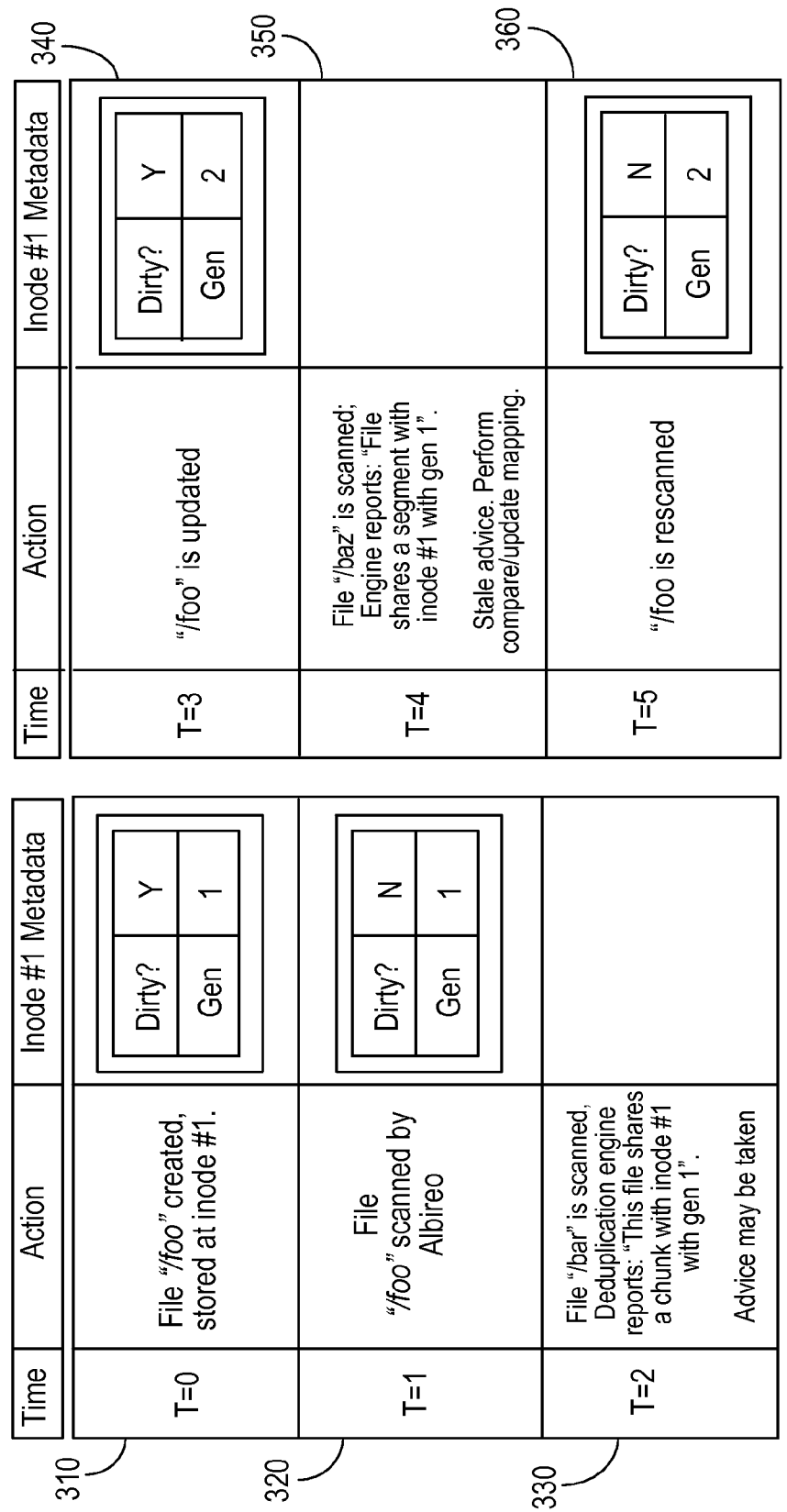
FIG. 3 is an example deduplication process.

Referring to FIG. 3, an example file system 300 using sequence (or generation) numbers is shown. As shown, each inode in the file system can be associated with two additional pieces of metadata: a dirty-bit, which indicates whether or not the file has been scanned for deduplication since its last modification, and a sequence field (typically a 64-bit integer) that tracks file modifications. At time T=1 (labeled 310), a file "/foo" is stored at inode #1 of the file system. The dirty-bit is set to "Yes" to indicate that the file has not been scanned by the deduplication engine 102. Further, the sequence number for the file is set to 1. At time T=2 (labeled 310), the file "/foo" is scanned by the deduplication engine 102, setting the dirty=bit to "No". The sequence number remains unchanged as the data is not altered by this process. At time T=3 (labeled 330), another file "/bar" is scanned by the deduplication engine 102. As shown, the deduplication advice indicates that the file "/bar" shares a "chunk", i.e., data segment, with the file "/foo" at inode #1 having a sequence number of 1. Since the sequence numbers are the same, the advice may be acted on by the software layer 108.

At time T=3 (labeled 340), the file "/foo" may be updated. This newly updated file has not been scanned by the deduplication engine 102 and as such the dirty-bit is set to "Yes". Further, since the file has been updated, a new sequence number of 2 is assigned. At time T=4 (labeled 350), a new file "/baz" is scanned by the deduplication engine 102, which reports that the file shares a data segment with the file "/foo" at the inode #1 with sequence number 1. However, since the sequence number of the file "/foo" at inode #1 is now 2, the advice is deemed stale. In this manner, the software layer 108 may not act upon the advice, and may instead perform other actions. For example, the software layer 108 may perform data comparison operations or update the file mappings. Subsequently, at time T=5 (labeled 360), the file "/foo" is rescanned by the deduplication engine 102, thus setting the dirty-bit to "No".

By including the sequence of the file in the data segment metadata (i.e., along with the inode number), deduplication advice is returned that indicates whether or not the file was modified since it was previously indexed. For files that are infrequently modified but are commonly duplicated (i.e., fixed-content), this mechanism may help avoid extra disk-reads when processing deduplication advice.

Referring to FIGS. 4A-C, a logical unit 400 implementing deduplication advice is shown. In some implementations, the deduplication engine 102 provides a mechanism for a storage medium to identify identical data segments within the logical unit (identified by a logical unit number or LUN). In some examples, the mechanism described below may allow for the medium to reclaim the space occupied by the duplicate segments for storing additional data. For example, the data segments may be reallocated as part of a system for volume extension.

In some situations, an example deduplication API can use two user-defined data structures for performing deduplication. For example, the data structures may store block addresses (represented by UdsBlockAddress) and callback data (represented by UdsCookie). The data structures can identify abstractions of the storage system. For instance, in a file system, the abstractions can be "block numbers" and the higher-level inodes that are referred to specific blocks. Within a logical unit, the abstractions can be "physical" segment numbers (which may themselves be further virtualized) and a higher level virtualization of those physical segments. For example, the physical segment numbers may be based on physical memory addresses and virtual segment numbers may be based on a higher level virtualization of the physical segments. As such, virtual memory addresses may be assigned to the virtual segments.

As such, physical segment numbers or physical chunk numbers (PCNs) 410 are the content of the UdsBlockAddress abstract data type, and virtual segment numbers or virtual chunk numbers (VCNs) 420 are the content of the UdsCookie abstract data type.

In an example scenario, consider that the logical unit 400 has one-to-one mapping between the PCN 410 and VCN 420. In this example scenario the logical unit 400 is assumed to contain no duplicate data.

The row labeled reference count "RefCnt" 430 counts a number of references for a particular PCN. When a logical unit is not using deduplication, the reference counts will either be zero or one.

Referring to FIG. 4B, in an example scenario, the virtual segments 97 and 98 may be updated so that their contents are substantially identical to the contents of virtual segments 94 and 95. When segments 97 and 98 are updated and rewritten to the storage, the storage system uses the udsPostBlock API call to provide the VCN, PCN, and data segment information for the updated segments. When the duplicate data is identified, the deduplication engine 102 may invoke a previously registered callback (e.g., udsRegisterDedupeBlockCallback) to provide the VCN and PCN of the duplicate block, along with the PCN of canonical location for that block. For example, after being notified of the update to VCN 97, mapped to PCN 97, the deduplication engine 102 can invoke the callback advising that VCN 97, currently mapped to PCN 97, should be remapped to point at PCN 94.

FIG. 4C shows the resulting state of logical unit 400 after the deduplication advice has been processed and the VCNs have been remapped. VCNs 94 and 97 are both mapped to share physical chunk 94, and VCNs 95 and 98 are both sharing physical chunk 95. The reference counts have also been updated to reflect this new mapping. In the process, physical chunks 97 and 98 are now unused. In addition to the scenarios described above in which deduplication advice can be implemented, other applications can include "copy on write" techniques and methods for extending a size of a logical unit.

Figure 5A:
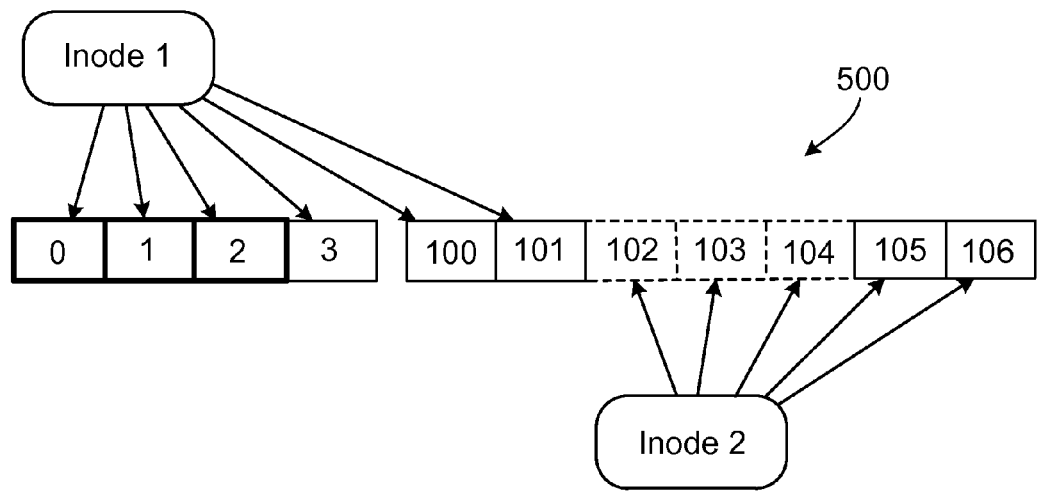
FIGS. 5A-B is an example file system using deduplication advice.
Figure 5B:
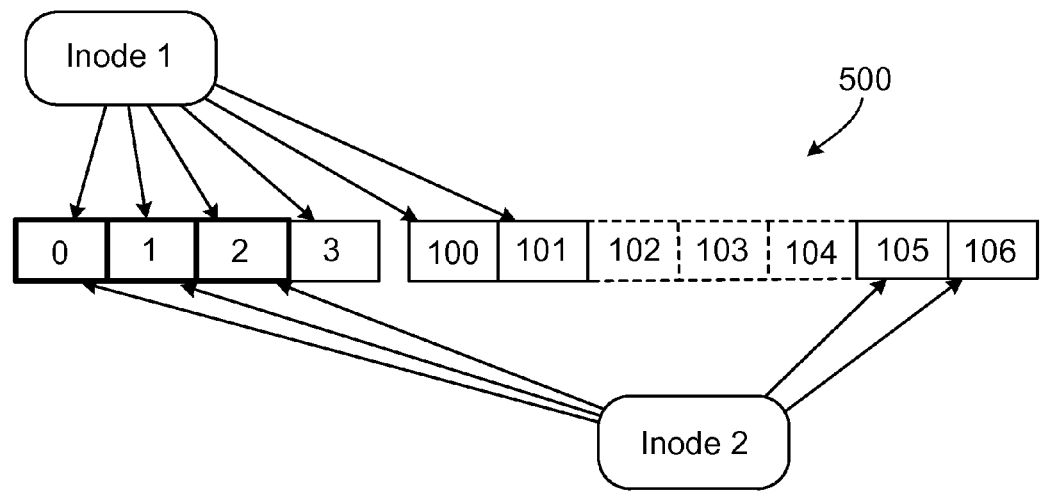

FIGS. 5A-C show an example scenario for implementing deduplication advice in a file system 500. In general, some storage systems can use a data segment (called "blocks") as their fundamental unit of storage allocation. In applications, segments may range in size from as little as 512 bytes to as large as 1 MB. To deduplicate block-based storage, in some examples, the deduplication engine 102 can identify blocks that contain the same data and implement references to those data-blocks to share storage. In this manner, while the data remains the same, only one copy of the data segment is needed.

FIG. 5A shows two inodes 510, 520 referencing blocks on a file system 500. As shown, the two inodes 510, 520 share same data segments (shaded). That is, segments 0, 1, and 2 are substantially identical to segments 102, 103, and 104.

The software layer 108 can deduplicate the data referenced by the inodes 510, 520 as long as it can reference the segments and provide the segments to the deduplication engine 102. For example, the software layer 108 may determine how to reference the software layer's 108 data storage elements.

In an example implementation, a segment reference can be identified with three items: an inode number, an index of the link (e.g., the third arrow of inode 1), and a sequence number for the link. Such a data structure may be packaged up as an instance of UdsCookie. In an example implementation, the segments can be identified by a segment number (e.g., number 104), and a sequence number for the segment. Such a data structure can constitute an instance of UdsBlockAddress.

As the software layer 108 stores the segments to the storage medium, the file system may call udsPostBlock with the link, the segment address, and the segment data. The deduplication engine 102 may compute the segment's signature and determines whether the segment has been indexed. If the segment is unknown it is stored in the index. Otherwise the deduplication engine 102 can use the UdsDedupeBlockCallback to inform the file system 500 that the link may be re-pointed at another segment having the same contents. The file system 500 may then free the unreferenced segment. The deduplication engine 102 can create new index entries in response to calls to udsPostBlock in connection with Inode 1.

In some examples, the deduplication engine 102 may generate duplicate data advisories to inform the file system 500 that the segment may be deduplicated with an existing copy elsewhere in response to calls to udsPostBlock when processing inode 2. In this regard, referring now to FIG. 5B, the result after inode 2 is processed is shown. The first 3 block references of Inode 2 are pointed at blocks zero through two, allowing blocks 102 through 104 to be freed.

Figure 6:
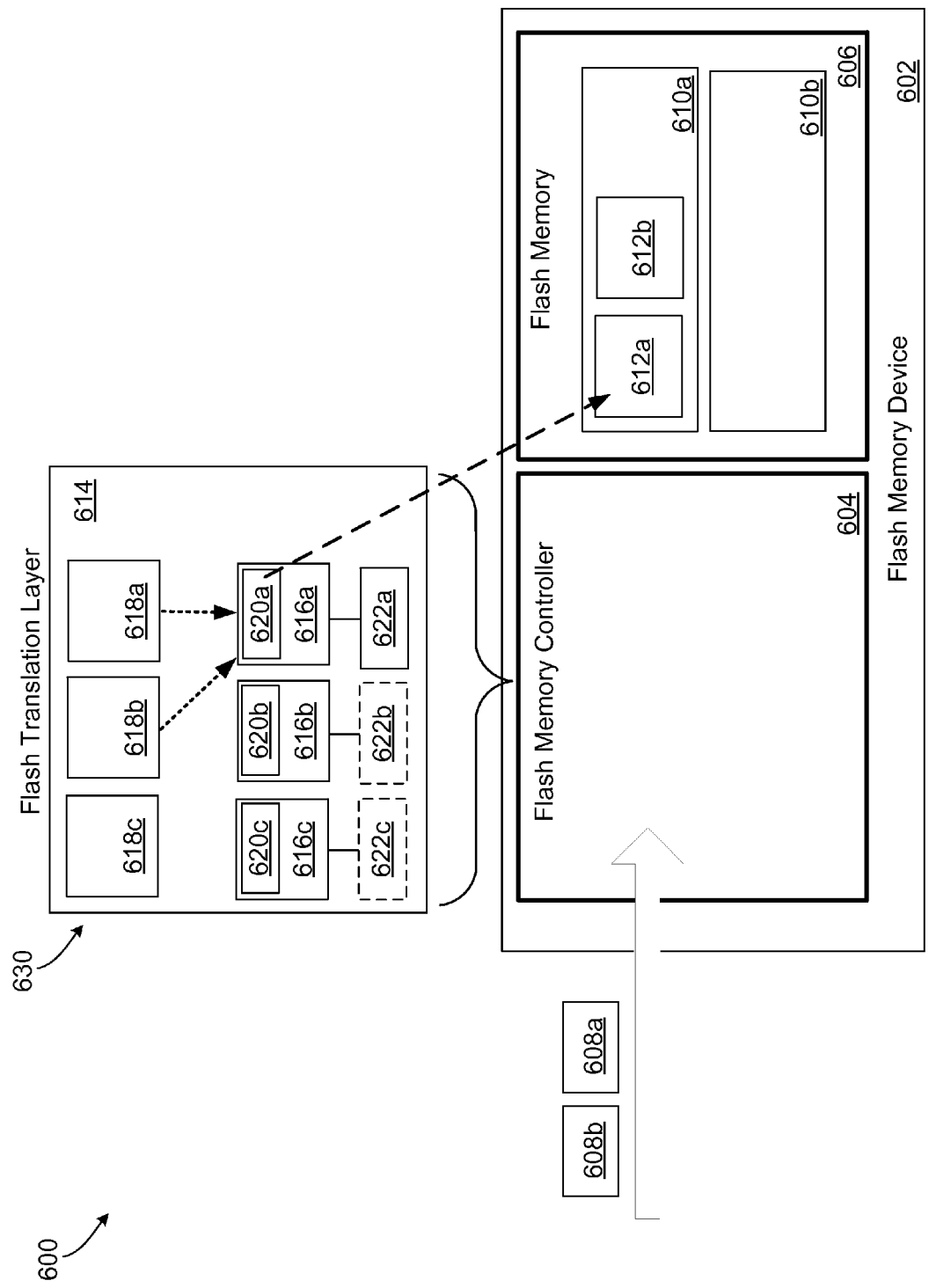
FIG. 6 shows a flash memory device.

FIG. 6 shows a portion of a configuration 600 of the system 100 in which the storage media 110 includes a flash memory device 602. A flash memory device is a data storage device (e.g., a component of a data storage system) that uses flash memory, sometimes called solid-state memory, to store data. Flash memory is made up of solid state components such as transistors which maintain a persistent electronic state even when power is not applied to the components, enabling the flash memory to serve as non-volatile storage (i.e., storage for data that persists even when the flash memory device is powered off). A portion of flash memory can be written or erased when control signals are applied to the portion of flash memory.

In some implementations, the flash memory device 602 includes a flash memory controller 604 and flash memory 606. The flash memory controller 604 receives instructions from the software layer 108, for example, instructions to store a portion, retrieve a portion of data, or erase a portion of data. The flash memory controller 604 also responds to instructions received from the software layer 108 and executes commands 608a, 608b upon the flash memory 606 generated based on the instructions received from the software layer 108. The flash memory 606 stores data and responds to commands executed by the flash memory controller 604. For example, the software layer 108 could identify a particular command 608a and instruct the flash memory controller 606 to execute the command 608a. (This technique can also be referred to as sending the command to the flash memory controller 604.)

In some implementations, the flash memory 606 is divided into portions called pages 610a, 610b. A page 610a is divided into smaller portions called blocks 612a, 612b. In some examples, the flash memory controller 604 is capable of executing commands 608a, 608b based on the constraints of the flash memory 606. For example, the flash memory 606 may enable blocks 612a, 612b to be written individually, such that a command 608a, 608b could be issued to write data to a particular one of the blocks 612a, 612b. In contrast, the flash memory 606 may enable pages 610a, 610b to be erased individually, such that a command could be issued to erase data stored in a particular one of the pages 610a, 610b. However, the flash memory 606 may not enable blocks 612a, 612b to be erased individually and does not support the execution of a command to erase a particular one of the blocks 612a, 612b. The commands 608a, 608b supported by the flash memory 606 may be determined by a manufacturer of the flash memory 606, for example, based on physical constraints of the flash memory 606.

Although the example shown in FIG. 6 shows a single flash memory device 602, in some examples, the storage media 110 may include multiple flash memory devices 202.

In some implementations, the flash memory controller 604 maintains a table 614 of physical locations 616a-c and virtual locations 618a-c associated with the flash memory device 202. For example, the physical locations 616a-c may correspond to individual blocks 612a, 612b of the flash memory 606. Each physical location 616a-c may have an address 620a-c each of which is an address of one of the blocks 612a, 612b. Each physical location 616a-c may also have an indicator 622a-c each of which indicates whether the block 612a, 612b corresponding to the physical location 616a-c is allocated or unallocated. The table 614 may be an example of a logical unit 400 used by the deduplication engine 102 to maintain information about which virtual segments correspond to which physical segments, as described above with respect to FIGS. 4A-C. A virtual segment is sometimes referred to as a logical segment.

A block can be said to be allocated if the block contains data (e.g., the flash controller 602 has written data to the block) and the data has not been marked for deletion. In contrast, a block can be said to be unallocated if the block either has never been written to, or if the block contains data but the data has been marked for deletion. In some examples, the flash controller 602 may receive instructions to delete data including data stored in a particular block 612a. Because blocks may not be capable of being individually erased, the indicator 622a of the physical location 616a corresponding to the block 612a can be set to an "unallocated" state. For example, the indicator 622a may be a single bit that can be set to one of two states, in which one state indicates an "allocated" state and one bit indicates an "unallocated" state. In FIG. 6, the indicator 622a represented with a solid line indicate an "allocated" state, and the indicators 622b, 622c represented with a dotted line indicate an "unallocated" state. When all of the other blocks in the page 610a containing the block 612a have indicators 622a-c set to "unallocated," the page 610a could be erased (and the blocks of the page rewritten) by the flash controller. In some implementations, the flash memory controller 604 can check to see if a physical location 216a-c is associated with a virtual location 618a-c before erasing a page 610a, 610b containing the physical location 616a-c. For example, the flash memory controller 604 could use this information in addition to or instead of an indicator 622a-c. In some implementations, the indicator 622a-c can differentiate between a block that has never been written to, and a block that was written to but has since become unallocated. For example, a page containing blocks that have never been written to would not need to be erased.

The table 614 that maps virtual locations to physical locations can be implemented as part of a flash translation layer 630 (FTL). The flash translation layer 630 may also maintain information about which blocks 612a, 612b correspond to which pages 610a, 610b in order to determine whether to unallocated or erase a particular block or page. In some examples, the FTL 630 has functionality for maintaining the life of the flash memory device 602. For example, a block may experience a failure if it is written to after a threshold number of times, which is kept track of by the FTL 630.

A physical location 616a-c has a one to one correspondence with a portion of data of the flash memory 606, such that each physical location 616a-c corresponds to one physical portion of the flash memory 606, e.g., a block 612a, 612b. Further, each block 612a, 612b will have a corresponding physical location 616a-c. In this way, the address 620a-c can be used in a command 608a, 608b to access one of the blocks 612a, 612b (e.g., read data from the block or write data to the block).

In contrast, the virtual locations 618a-c need not have a one to one correspondence to portions of data of the flash memory 606. For example, two virtual locations 618a, 618b may correspond to the same physical location 616a. Further, one or more of the physical locations 616a-c may not have a corresponding virtual location 618a-c. In this way, the use of physical locations 616a-c and virtual locations 218a-c is an implementation of the use of physical segments and virtual segments, described above with respect to FIGS. 4A-C.

In some implementations, the table 614 that maps virtual locations to physical locations can be used to facilitate deduplication. In some examples, the deduplication engine 102 can be provided with information about the table 614 maintained by the flash memory controller 604, and the flash memory controller 604 can be configured to execute commands 608a, 608b based on instructions from the deduplication engine 102. For example, the flash memory controller 604 can be configured to execute a command 608a that merges two virtual locations 618a, 618b. In this example, prior to the execution of the command 608a, the first virtual location 618a is assigned to one physical location 616a, and the second virtual location 618b is assigned to another physical location 616b. When the command 608a is executed, the flash memory controller assigns the physical location 616a referenced by the first virtual location 618a to the second virtual location 618b, so that the first and second virtual locations 618a, 618b reference the same physical location 616a. This technique is sometimes called merging the locations (i.e., merging the first virtual location 618a to the second virtual location 618b). In some implementations, the flash memory controller 604 can then set the indicator 622b of the other physical location 616b to indicate that the physical location 616b is unallocated (and can be overwritten). In some implementations, the flash memory controller 606 is designed to interface with the deduplication engine 102, e.g., designed to support a command 608a that merges two virtual locations 618a, 618b. For example, the command 608a can be added to a set of commands supported by the flash memory controller 606 based on requirements of the deduplication engine 102.

In some implementations, the deduplication engine 102 uses index records, e.g., the index record 175 shown in FIG. 1C, to maintain information about which virtual locations 618a-c can be merged. For example, the key portion 178 of an index record 175 can contain data derived from the contents of a block (or other portion of data) corresponding to a physical location 216a-c and the value portion 180 of the index record 175 can reference one of the virtual locations 218a-c. If two index records 175 contain the same data in their key portions, for example, then the virtual locations referenced by the value portions can be merged, since they contain the same data.

Figure 7:
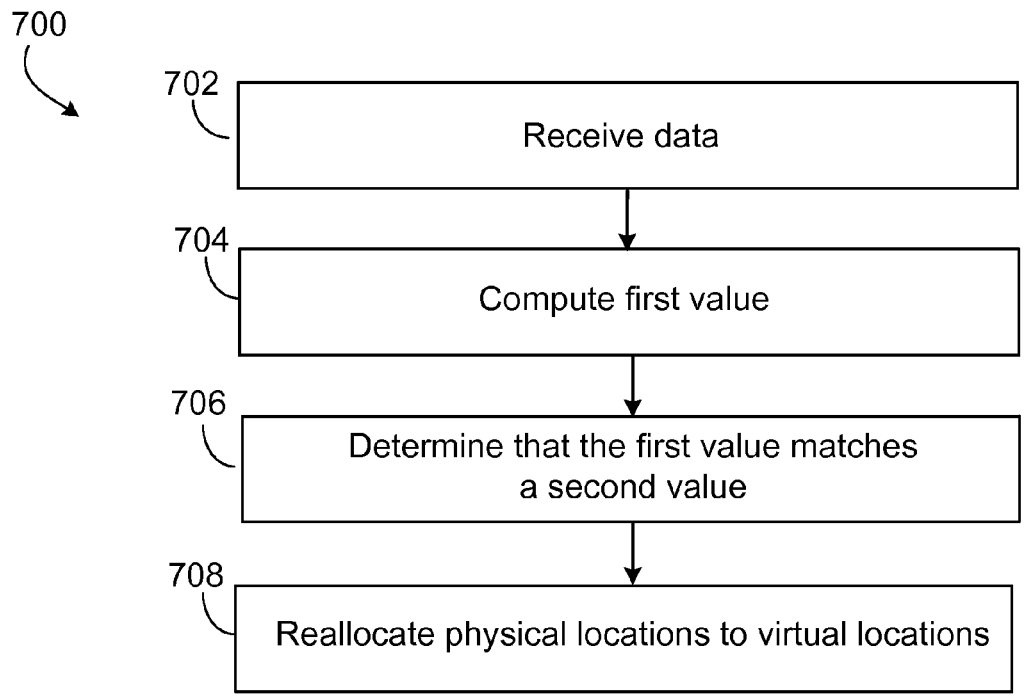
FIGS. 7-8 are flowcharts.

FIG. 7 shows a process 700 implementing some of the techniques described herein with respect to FIGS. 1A-6. The process 700 includes receiving 702, at a data deduplication engine of a computer system, data to be stored in a data storage system. The process 700 includes computing 704 a first value corresponding to at least one portion of the received data (e.g., a hash of the received data). The process 700 includes determining 706 that the first value matches a second value stored in a collection of identifiers. Each identifier can correspond to a particular portion of data stored in the data storage system, such that each identifier includes a computed value corresponding to the particular portion of data (e.g., a hash of the data), and includes metadata indicating a location where the particular portion of data is being stored in the data storage system (e.g., a reference to a virtual segment).

The process 700 includes reallocating 708 one or more physical locations from corresponding one or more virtual locations to different respective one or more virtual locations. The reallocation is carried out based on the determination that the first value matches a second value stored in the collection of identifiers. In some examples, each virtual segment represents a portion of storage of a flash memory device. For example, the portion of storage of the flash memory device could be a block of the flash memory device. In some implementations, reallocating the physical locations includes making a request that a first portion of storage represented by a first virtual segment (e.g., a block) be merged with a second portion of storage represented by a second virtual segment (e.g., a different block). The data deduplication engine could make this request to a flash memory controller in communication with the flash memory device, e.g., by sending a command to the flash memory controller.

Figure 8:
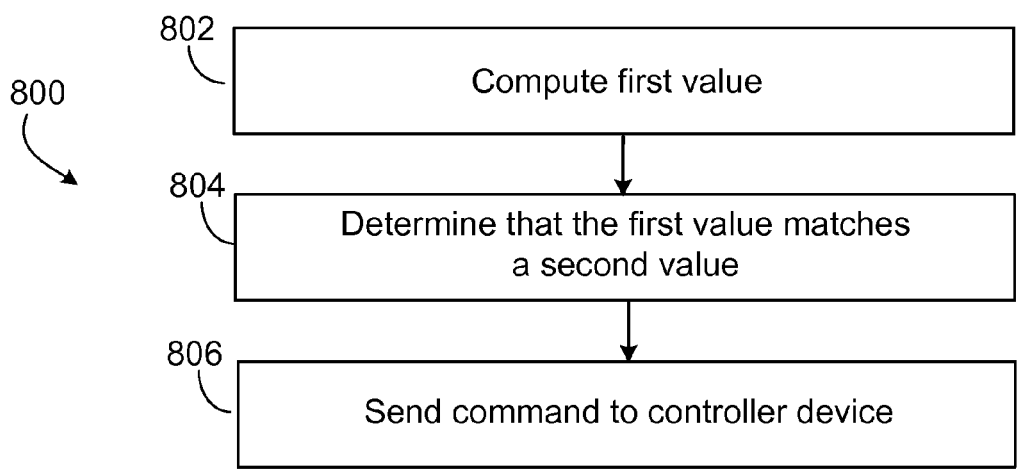

FIG. 8 shows a process 800 implementing some of the techniques described herein with respect to FIGS. 1A-6. The process 800 can be carried out, for example, by a data deduplication engine 102 of a computer system, as shown in FIG. 1.

The process 800 includes computing a first value corresponding to at least one portion of data. For example, the first value could be a hash of the portion of data. The process 800 includes determining that the first value matches a second value stored in a collection of identifiers. Each identifier corresponds to a particular portion of data stored in the data storage system, such that each identifier comprising a computed value corresponding to the particular portion of data and including metadata indicating a location where the particular portion of data is being stored in a data storage system.

The process 800 includes sending a command to a controller device of the data storage system. For example, the data storage system could include a flash memory device, and the controller device could be a flash memory controller. The command is sent based on the determination that the first value matches a second value stored in the collection of identifiers. The command includes instructions to associate two virtual locations of the data storage system with a first physical location of the data storage system. This is sometimes referred to as merging the locations, e.g., merging two blocks of flash memory.

In some examples, the command causes the controller device to designate a second physical location of the data storage system as unallocated. For example, the second physical location can be associated with a first virtual location corresponding to a location indicated by a first identifier associated with the first value, and so designating the second physical location of the data storage system as unallocated includes removing the association between the first virtual location and the second physical location. In some implementations, the command identifies a first virtual location and a second virtual location, the first virtual location corresponding to a location indicated by a first identifier associated with the first value, and the second virtual location corresponding to a location indicated by a second identifier associated with the second value.

The techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer or delivered over a communication medium (e.g., encoded in a propagated signal) such as network to a computer where it is executed. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

Many other implementations of the invention other than those described above are within the invention, which is defined by the following claims.

What is claimed is:

1. A method for managing data, the method comprising:
receiving, at a data deduplication engine executing on at least one processor of a computer system, data stored in a data storage system in communication with the computer system,
wherein the data storage system comprises at least one flash memory device that includes a flash memory controller and a flash memory;
computing, by the at least one processor, a first value corresponding to at least one portion of the received data;
determining, by the at least one processor, that the first value matches a second value stored in a collection of identifiers,
each identifier corresponding to a particular portion of data stored in the flash memory of the flash memory device, each identifier comprising a computed value corresponding to the particular portion of data and including metadata indicating a location where the particular portion of data is being stored in the flash memory of the flash memory device;
determining, by the at least one processor, that a first virtual location of the flash memory contains a portion of data corresponding to an identifier that corresponds to the first value; and
based on the determination that the first value matches a second value stored in the collection of identifiers, and on the determination that the first virtual location contains the portion of data corresponding to the identifier that corresponds to the first value,
communicating, by the at least one processor, to the flash memory controller of the flash memory device, a request to:
1) allocate the first virtual location of the flash memory to a first physical location of the flash memory, the first physical location being associated with at least a second virtual location of the flash memory, and 2) remove an association between the first virtual location and a second physical location of the flash memory.

2. The method of claim 1, wherein each virtual location represents a portion of storage of the flash memory device.

3. The method of claim 2, wherein the portion of storage of the flash memory device comprises a block of the flash memory.

4. The method of claim 1, wherein communicating to the flash memory controller of the flash memory device the request to allocate the first virtual location of the flash memory to a first physical location of the flash memory, the first physical location being associated with at least the second virtual location of the flash memory comprises:
    making a request that the first virtual location be merged with the second virtual location into a single virtual location corresponding to the first physical location.

5. The method of claim 1, wherein the first virtual location is allocated to a portion of data corresponding to the identifier corresponding to the first value, and wherein the second virtual location is allocated to a portion of data corresponding to the identifier corresponding to the second value.

6. The method of claim 1, comprising, based on the determination that the first value matches a second value stored in the collection of identifiers, designating the second physical location as unallocated, wherein the second physical location contains a portion of data corresponding to the identifier corresponding to the first value.

7. The method of claim 6, wherein designating the second physical location as unallocated comprises the removing of the association between the first virtual location and the second physical location.

8. The method of claim 1, comprising receiving an indication that an identifier corresponding to a portion of the received data was previously stored in the collection of identifiers, and, in response, verifying that the indicated identifier still corresponds to a portion of data stored in the flash memory.

9. The method of claim 1, the first and second virtual locations comprise virtual segments.

10. A method comprising:
    at a data deduplication engine of a computer system in communication with a data storage system, wherein the data storage system comprises at least one flash memory device that includes a flash memory controller and a flash memory:
        computing a first value corresponding to at least one portion of data, and
        determining that the first value matches a second value stored in a collection of identifiers,
    each identifier corresponding to a particular portion of data stored in the data storage system, each identifier comprising a computed value corresponding to the particular portion of data and including metadata indicating a location where the particular portion of data is being stored in the data storage system; and
    based on the determination that the first value matches a second value stored in the collection of identifiers, sending a command to the flash memory controller of the flash memory device,
    the command comprising an identification of a first virtual location and a second virtual location,
    the command comprising instructions to associate the first and second virtual locations of the flash memory with a first physical location of the flash memory, and
    the command comprising instructions to remove an association between the first virtual location and a second physical location,
    wherein the first virtual location corresponds to a location indicated by a first identifier associated with the first value.

11. The method of claim 10, wherein the command causes the controller device to designate the second physical location of the flash memory as unallocated.

12. The method of claim 10, wherein
    the second virtual location corresponds to a location indicated by a second identifier associated with the second value.

13. A system comprising:
    a data storage device comprising at least one flash memory device, the flash memory device including a flash memory controller and a flash memory;
    a data deduplication engine configured to:
    compute a first value corresponding to at least one portion of data,
    determine that the first value matches a second value stored in a collection of identifiers,
        each identifier corresponding to a particular portion of data stored in the flash memory, each identifier comprising a computed value corresponding to the particular portion of data and including metadata indicating a location where the particular portion of data is being stored in the flash memory, and
        based on the determination that the first value matches a second value stored in the collection of identifiers, send a command to the flash memory controller of the flash memory device,
        the command comprising an identification of a first virtual location and a second virtual location,
        the command comprising instructions to associate the first and second virtual locations of the flash memory with a first physical location of the flash memory
        the command comprising instructions to remove an association between the first virtual location and a second physical location,
        wherein the first virtual location corresponds to a location indicated by a first identifier associated with the first value.

14. The system of claim 13, wherein the flash memory controller is configured to, in response to the command, designate a second physical location of the flash memory as unallocated.

15. The system of claim 14, wherein the flash controller is configured to designate the second physical location of the flash memory as unallocated by the removing of the association between the first virtual location and the second physical location.

16. The system of claim 13, wherein
    the second virtual location corresponds to a location indicated by a second identifier associated with the second value.

17. The system of claim 13, wherein each of the two virtual segments represents a portion of storage of the flash memory.

* * * * *